(12) United States Patent  
Breinich et al.

(10) Patent No.: US 6,854,416 B2  
(45) Date of Patent: Feb. 15, 2005

(54) DISPLAY INSTRUMENT

(75) Inventors: Herbert Breinich, Wiesbaden (DE); Bertram Eschenbach, Röllbach (DE); Karl-Heinz Mittenbühler, Griesheim (DE); Sabine Vorberg, Aschaffenburg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/021,896

(22) Filed: Dec. 17, 2001

(65) Prior Publication Data

US 2002/0108555 A1 Aug. 15, 2002

(30) Foreign Application Priority Data

Dec. 21, 2000 (DE) .......................................... 100 63 875

(51) Int. Cl.⁷ .............................................. G01D 11/28
(52) U.S. Cl. .......... 116/202; 116/DIG. 5; 116/DIG. 36; 116/286
(58) Field of Search .......................... 116/202, DIG. 5, 116/DIG. 15, DIG. 36, 284, 293, 300, DIG. 3, 286–288, 26–27, 29–30; 362/26, 27, 29, 30

(56) References Cited

U.S. PATENT DOCUMENTS

| | | | | |
|---|---|---|---|---|
| 2,536,557 A | * | 1/1951 | Levesque | 116/286 |
| 4,380,043 A | * | 4/1983 | Takamatsu et al. | 362/26 |
| 5,319,527 A | * | 6/1994 | Murphy et al. | 362/26 |
| 5,706,757 A | * | 1/1998 | Hashimoto et al. | 116/288 |
| 6,032,608 A | * | 3/2000 | Oreans et al. | 116/288 |
| 6,082,288 A | * | 7/2000 | Kato et al. | 116/286 |
| 6,178,917 B1 | * | 1/2001 | Jansa | 116/286 |
| 6,224,221 B1 | * | 5/2001 | Glienicke | 116/286 |
| 6,234,106 B1 | * | 5/2001 | Dohnal et al. | 116/284 |
| 6,314,908 B1 | * | 11/2001 | Olbrich et al. | 116/288 |
| 6,408,784 B1 | * | 6/2002 | Ross | 116/288 |
| 6,470,822 B2 | * | 10/2002 | Adams et al. | 116/284 |
| 2002/0135994 A1 | * | 9/2002 | Ikarashi et al. | 362/23 |

FOREIGN PATENT DOCUMENTS

| | | |
|---|---|---|
| DE | 31509436 | 6/1983 |
| DE | 3300271 | 7/1984 |
| DE | 3906721 | 9/1990 |
| DE | 4318554 | 12/1994 |
| DE | 19828041 | 1/2000 |

OTHER PUBLICATIONS

Patent Abstract of Japan, Sep. 7, 1993, JP 05232266 A, (Nippodenso Co LTD), Feb. 18, 1992.  
Patent Abstracts of Japan, Mar. 26, 1993, JP 0572362 A (Nippodenso Co LTD), Sep. 18, 1991.

* cited by examiner

Primary Examiner—Diego Gutierrez  
Assistant Examiner—Tania C. Courson  
(74) Attorney, Agent, or Firm—Martin A. Farber

(57) ABSTRACT

A display instrument with two illuminated pointers, in which instrument the illuminated pointers (4, 6) are supplied with light via a light splitter (10). The latter has a frustum-shaped depression (21) so that a portion of the light is radiated in the axial direction and passes into the upper illuminated pointer (4). A further portion is scattered radially at the generated surface (24) of the frustum (23) and passes into the lower illuminated pointer (6).

15 Claims, 1 Drawing Sheet

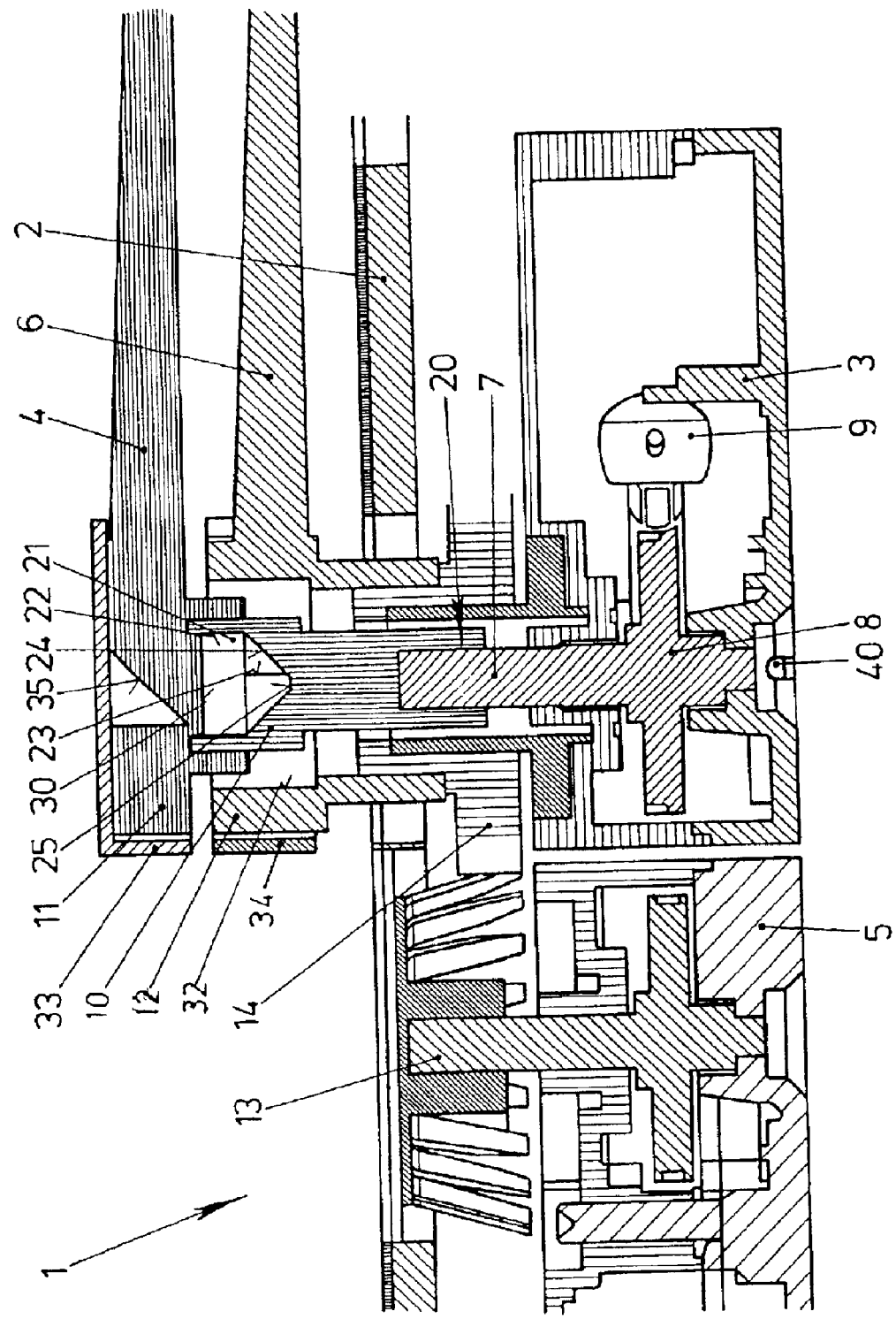

DISPLAY INSTRUMENT

FIELD AND BACKGROUND OF THE INVENTION

The invention relates to a display instrument having at least two illuminated pointers which are located one on top of the other, are each composed of a head and a pointer lug and can be rotated independently of one another about a common display axis, the illuminated pointers being composed of a light-guiding material and each having a light entry face, and the light injected there exiting on the side of the pointer lugs facing the viewer.

Such display instruments have become established in particular in the construction of vehicles because they ensure reliable readability in the dark: the illuminated pointer lugs form, for the driver, a clear contrast against a dark dial with numerals which are also illuminated.

The effort incurred, in particular to supply the illuminated pointers with light is, however, considerable. Light guides are used to guide light from a light source in the housing of the display instrument to the light entry face of the illuminated pointers. The design becomes particularly difficult if the display instrument has two illuminated pointers which are arranged one on top of the other and have a common axis of rotation.

The previously known arrangements are relatively complicated and also have the disadvantage that scattered light which illuminates the dial occurs so that the contrast between the illuminated pointers and the dial background is reduced.

SUMMARY OF THE INVENTION

The invention is therefore based on the object of significantly improving the supply of light for two illuminated pointers which are arranged one on top of the other. In particular, the intention is to ensure that the design and assembly are as simple as possible and that as little scattered light as possible occurs.

The invention therefore proposes a display instrument as claimed in the preamble of claim 1, there being a common light source for at least two of the illuminated pointers, and the light being fed to the pointers via a light splitter.

In this arrangement, only one light and one light guide is required because the light which exits from the light splitter is injected directly into the pointers, the light splitter being preferably arranged at the light exit end of a light guide.

This permits a very simple design which can be simplified even further if the drive shaft of a pointer serves as a light guide and part of the drive shaft is embodied as a light splitter. In this arrangement, there is virtually no need for any additional parts because with this solution an already existing part, namely the drive shaft, assumes a further function.

In order to simplify the assembly, it may be necessary to embody the light splitter as a separate component which is plugged onto the main part of the drive shaft.

The light splitter is embodied in such a way that a portion of the light entering it is passed on in the axial direction and a further part of the light which enters is irradiated radially. Correspondingly, one illuminated pointer (the upper one) has a light entry face which picks up the light exiting in the axial direction, this illuminated pointer being plugged on to the light splitter with its head so that the light which emerges from the light splitter is injected into the entry face arranged on the underside of the hood.

Furthermore, another pointer (the lower one), which is generally arranged under the upper pointer, is provided with a light entry face which picks up the laterally exiting light.

For this purpose, the head of this illuminated pointer is constructed as a ring whose inner generated surface forms the light entry face and which is arranged coaxially with respect to the light splitter.

In order to achieve the desired splitting of the light, the light splitter is of cylindrical construction, an axial depression, which ends in a frustum, being provided in the upper end face at the end of a drive shaft. Its base face runs perpendicularly with respect to the axis of rotation of the drive shaft so that light exits there in the axial direction. The generated surface of the frustum runs at an angle of 45° with respect to the axis of rotation so that it serves as a reflection face and the light which enters the light splitter from below is deflected to the side in the radial direction.

A portion of the light which impinges on the generated surface is not reflected but rather merely refracted and also directed onto the light entry face of the upper pointer in an essentially axial direction. The extent of the generated surface and that of the base face are matched to one another in such a way that both illuminated pointers are supplied with approximately identical portions of light, and thus appear to have the same degree of brightness.

BRIEF DESCRIPTION OF THE DRAWING

The invention will be explained in more detail below in a FIGURE with reference to an exemplary embodiment.

DETAILED DESCRIPTION OF THE PREFERRED EMBODIMENT

The FIGURE shows a cross section through a display instrument 1. Below the dial 2 there is a first drive unit 3 for an upper illuminated pointer 4 and a second drive unit 5 for a lower illuminated pointer 6 which is arranged underneath the upper illuminated pointer 4.

The first drive unit 3 is coupled to the upper illuminated pointer 4 via a drive shaft 7 which is constructed as a light guide. The drive shaft 7 is composed of a main part 8, which is connected to an electrical actuating motor 9 by means of a worm gear mechanism. The light splitter 10 is plugged onto the main part 8 of the drive shaft 7 and thus functions as an extension of the main part 8 of the drive shaft 7. The upper illuminated pointer 4 is plugged, with its head 11, onto the upper end of the light splitter 10.

The head 12 of the lower illuminated pointer 6 is constructed as a ring which is located coaxially with respect to the light splitter 10. It is driven via a worm gear mechanism 14 by the drive shaft 13 of the second drive unit 5 which runs parallel to the drive shaft 7 of the first drive unit 3.

The light splitter 10 has an essentially cylindrical element, a drilled hole 20, in which the upper end of the main part 8 of the drive shaft 7 is plugged, being let into the lower end face.

A depression 21, which has a cylindrical section 22 and merges further below into a frustum 23 having a generated surface 24 and base face 25, is made in the upper end side.

The light beams which pass from bottom to top through the drive shaft 7 impinge on the base face 25 in the center of the beam and exit from the light splitter 10 in the axial direction. The light beams which run further outwards in the radial direction impinge on the generated surface 24, which act as a reflection face, so that these beams are for the most part irradiated from the light splitter 10 over its outer generated surface in the radial direction at an angle of 45°.

The portion of the light which impinges on the generated surface 24 is not reflected but rather refracted and also exits the light splitter 10 in an essentially axial direction.

The head 11 of the lower illuminated pointer 6 has a light entry face 30 which is located above the depression. The axial beams of the light splitter 10 impinge here and are injected into the illuminated pointer 6. In the head there is a cut-out with an obliquely extending reflection face 35. From there, the beams are deflected into the pointer lug, and at its surface they exit, if appropriate after a further reflection at the base of the lug.

The inner generated surface 32 of the annular head 12 of the lower illuminated pointer 6 is at the same level as the frustum 23 of the depression 21 so that the laterally exiting light can enter this generated surface 32. The light is irradiated in all the angular ranges, only the light which is directed in the angular range of the pointer being passed on into the pointer lug and exiting there also at the upper face of the lug, if appropriate after a further reflection at the base of the lug.

In order to avoid scattered light, both pointer heads are provided with covers: a non-translucent cap is placed on the head 11 of the upper illuminated pointer 4 and covers the upper side of the head 11 and its side face.

A non-translucent covering ring is attached to the annular head 12 of the lower illuminated pointer 6 and engages in an annular shape around the outer generated surface.

The light for illuminating the pointers originates from a light-emitting diode 40 which is arranged below the end of the drive shaft 7 which is remote from the light splitter 10 and injects light into the end side of the drive shaft 7.

Splitting of light in order to illuminate two coaxial pointers from one light guide 1 Display instrument
 2 Dial
 3 First drive unit
 4 Illuminated pointer
 5 Second drive unit
 6 Illuminated pointer
 7 Drive shaft
 8 Main part
 9 Actuating motor
10 Light splitter
11 Head
12 Head
13 Drive shaft
14 Gearwheel mechanism
20 Drilled hole
21 Depression
22 Cylindrical section
23 Frustum
24 Generated surface
25 Base face
30 Light entry face
32 Generated surface
33 Cap
34 Cover
35 Reflection face
40 Light-emitting diode
SEARCH WORDS:
LIGHT SPLITTER
COAXIAL POINTERS
FRUSTUM

We claim:
1. A display instrument comprising
at least two illuminated pointers which are located one on top of the other, each composed of a head and a pointer lug and rotatable independently of one another about a common display axis, the illuminated pointers being composed of a light-guiding material and each having a light entry face and light injected there exiting on a side of the pointer lugs facing a viewer,
a drive unit (3), the drive unit (3) driving an upper pointer (4) of said pointers, a lower pointer (6) of said pointers being located, or moveable, between the drive unit (3) and the upper pointer (4), wherein for at least two of the illuminated pointers (4, 6) there is a common light source, and light is fed to the illuminated pointers (4, 6) via a light splitter (10), wherein a drive shaft (7) of the upper pointer (4) serves as a light guide and a portion of the drive shaft (7) is embodied as the light splitter (10), and the light is led from the drive shaft (7) of the upper pointer (4) via the light splitter (10) to a generated surface (32) of the lower pointer (6), and
light from the light source enters a bottom portion of the drive shaft, and is conducted via the drive shaft (7) through the drive unit (3) to the light splitter (10).

2. The display instrument as claimed in claim 1, wherein the light splitter (10) is plugged together with a main part (8) of the drive shaft (7).

3. The display instrument as claimed in claim 1, wherein in the light splitter (10), one portion of the light exits in a direction of an axis of rotation and a further portion exits perpendicular thereto.

4. The display instrument as claimed in claim 3, wherein an upper of the illuminated pointers (4) has the light entry face (30) which picks up the light exiting in the axial direction, said upper illuminated pointer (4) being plugged onto the light splitter (10).

5. The display instrument as claimed in claim 4, wherein a lower of said illuminated pointers (6) has the light entry face which picks up laterally exiting light.

6. The display instrument as claimed in claim 5, wherein a head (12) of the lower illuminated pointer (6) surrounds the light splitter (10) in an annular shape and the light entry face is embodied on an inner said generated surface (32) in the head (12).

7. The display instrument as claimed in claim 1, wherein in the light splitter (10), one portion of the light exits in a direction of an axis of rotation and a further portion exits perpendicular thereto.

8. The display instrument as claimed in claim 7, wherein an upper of the illuminated pointers (4) has the light entry face (30) which picks up the light exiting in the axial direction, said upper illuminated pointer (4) being plugged onto the light splitter (10).

9. The display instrument as claimed in claim 8, wherein a lower of said illuminated pointers (6) has the light entry face which picks up laterally exiting light.

10. The display instrument as claimed in claim 9, wherein a head (12) of the lower illuminated pointer (6) surrounds the light splitter (10) in an annular shape and the light entry face is embodied on an inner said generated surface (32) in the head (12).

11. The display instrument as claimed in claim 1, wherein the light splitter (10) has a frustum-shaped coaxial depression (21), a generated surface (24) of frustum (23) serving as a reflection face for laterally exiting light and a base face (25) serving as an exit face for axially exiting light.

12. The display instrument as claimed in claim 1, where the light source is positioned in axial direction of the drive shaft (7).

13. The display instrument as claimed in claim 12, wherein the light source is a light-emitting diode (40) which is arranged below an end of the drive shaft (7) which is remote from the light splitter (10) and injects light into the end of the drive shaft (7).

14. A display instrument comprising:

at least two illuminated pointers which are located one on top of the other, each composed of a head and a pointer lug, the illuminated pointers being rotatable independently of one another about a common display axis, the pointers being composed of a light-guiding material and each having a light entry face wherein light injected at the entry face exits on a side of the pointer lugs facing a viewer;

a drive unit (3), the drive unit (3) driving an upper pointer (4) of said pointers, a lower pointer (6) of said pointers being located for movement between the drive unit (3) and the upper pointer (4), wherein for at least two of the illuminated pointers (4, 6) there is a common light source on a side of the drive unit opposite the pointers, and light is fed to the illuminated pointers (4, 6) via a light splitter (10), wherein a drive shaft (7) of the upper pointer (4) serves as a light guide and a portion of the drive shaft (7) is embodied as the light splitter (10), and the light is led from the light source via the drive shaft (7) of the upper pointer (4) through the drive unit to the light splitter (10) and via the light splitter to a generated surface (32) of the lower pointer (6); and wherein the light splitter 10 has a frustum-shaped coaxial depression located on an axis of the drive shaft (7) of the upper pointer for directing rays of a portion of the light from the light source toward the upper pointer and further rays from a further portion of the light from the light source toward the lower pointer.

15. A display instrument comprising:

at least two illuminated pointers which are located one on top of the other, each composed of a head and a pointer lug, the illuminated pointers being rotatable independently of one another about a common display axis, the pointers being composed of a light-guiding material and each having a light entry face wherein light injected at the entry face exits on a side of the pointer lugs facing a viewer;

a drive unit (3), the drive unit (3) driving an upper pointer (4) of said pointers, a lower pointer (6) of said pointers being located for movement between the drive unit (3) and the upper pointer (4), wherein for at least two of the illuminated pointers (4, 6) there is a common light source, and light is fed to the illuminated pointers (4, 6) via a light splitter (10), wherein a drive shaft (7) of the upper pointer (4) serves as a light guide and a portion of the drive shaft (7) is embodied as the light splitter (10), and the light is led from the light source via the drive shaft (7) of the upper pointer (4) to the light splitter (10) and via the light splitter to a generated surface (32) of the lower pointer (6); and wherein the light splitter 10 has a frustum-shaped coaxial depression located on an axis of the drive shaft (7) of the upper pointer for directing rays of a portion of the light from the light source toward the upper pointer and further rays from a further portion of the light from the light source toward the lower pointer.

* * * * *